US010687370B2

(12) United States Patent
DeLuca et al.

(10) Patent No.: US 10,687,370 B2
(45) Date of Patent: Jun. 16, 2020

(54) POPULATION OF USER IDENTIFIERS BASED ON NEARBY DEVICES

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 15/227,098

(22) Filed: Aug. 3, 2016

(65) Prior Publication Data
US 2018/0039384 A1   Feb. 8, 2018

(51) Int. Cl.
*H04W 76/10* (2018.01)
*H04W 8/00* (2009.01)
*H04W 4/80* (2018.01)
*H04W 4/02* (2018.01)

(52) U.S. Cl.
CPC ........... *H04W 76/10* (2018.02); *H04W 4/023* (2013.01); *H04W 4/80* (2018.02); *H04W 8/005* (2013.01); *G06F 2203/0382* (2013.01); *G06F 2203/0384* (2013.01)

(58) Field of Classification Search
CPC ....... H04W 76/10; H04W 4/80; H04W 8/005; H04W 4/023; G06F 2203/0384; G06F 2203/0382
See application file for complete search history.

(56) References Cited

U.S. PATENT DOCUMENTS

| | | | |
|---|---|---|---|
| 7,254,367 B2 | 8/2007 | Helden et al. | |
| 7,856,373 B2 | 12/2010 | Ullah | |
| 8,045,961 B2 | 10/2011 | Ayed et al. | |
| 8,472,874 B2 | 6/2013 | Tang et al. | |
| 8,478,716 B2 | 7/2013 | Flinn et al. | |
| 8,510,381 B1 | 8/2013 | Birand et al. | |
| 9,619,299 B2* | 4/2017 | Cox | G06F 9/52 |
| 9,955,331 B2* | 4/2018 | Hrabak | H04W 4/80 |

(Continued)

OTHER PUBLICATIONS

Erik Welsh et al., "Improving Connection Times for Bluetooth Devices in Mobile Environments", International Conference on Fundamentals of Electronics Communications and Computer Sciences (ICFS), 2002, 6 pages.

(Continued)

*Primary Examiner* — Ryan F Pitaro
(74) *Attorney, Agent, or Firm* — Michael P. O'Keefe; Maxine L. Barasch; Keohane & D'Alessandro PLLC

(57) ABSTRACT

Methods and systems for population of user identifiers based on nearby devices are disclosed. One or more user identifiers are entered into a first electronic device. When the first electronic device is in proximity to a second electronic device, and a user prepares to log on to the second electronic device, the one or more user identifiers from the first electronic device are retrieved by the second electronic device and presented to the user for selection. The user identifiers may be displayed in a prioritized state based on particular factors. Sharing policies for particular user identifiers may be set based on user input. The user can then select one of the presented user names for logging on to an account with the second electronic device.

17 Claims, 11 Drawing Sheets

(56) References Cited

U.S. PATENT DOCUMENTS

| | | | | |
|---|---|---|---|---|
| 2005/0091213 | A1* | 4/2005 | Schutz | G06F 21/31 |
| 2008/0072170 | A1* | 3/2008 | Simons | G06F 40/174 |
| | | | | 715/769 |
| 2008/0109852 | A1* | 5/2008 | Kretz | G11B 27/002 |
| | | | | 725/62 |
| 2009/0113560 | A1* | 4/2009 | Kori | G06F 21/10 |
| | | | | 726/29 |
| 2010/0216401 | A1* | 8/2010 | Kitahara | H04M 1/6091 |
| | | | | 455/41.2 |
| 2011/0185437 | A1* | 7/2011 | Tran | H04L 63/104 |
| | | | | 726/28 |
| 2014/0362713 | A1* | 12/2014 | Agarwal | H04W 24/08 |
| | | | | 370/252 |
| 2015/0142975 | A1* | 5/2015 | Hong | H04L 63/104 |
| | | | | 709/225 |
| 2015/0209676 | A1* | 7/2015 | Tsuchiya | A63F 13/79 |
| | | | | 463/29 |
| 2015/0370612 | A1 | 12/2015 | Cox et al. | |
| 2016/0072780 | A1* | 3/2016 | Seto | G06F 17/243 |
| | | | | 726/7 |
| 2016/0080892 | A1* | 3/2016 | Basalamah | H04W 4/023 |
| | | | | 455/41.2 |
| 2016/0086108 | A1 | 3/2016 | Abelow | |
| 2016/0132563 | A1* | 5/2016 | Bhandari | G06F 16/24575 |
| | | | | 707/730 |
| 2016/0156592 | A1* | 6/2016 | Walters | H04L 67/02 |
| | | | | 726/7 |
| 2016/0371099 | A1* | 12/2016 | Woog | G06F 9/44505 |
| 2017/0013152 | A1* | 1/2017 | Morii | H04N 1/00506 |
| 2017/0052587 | A1* | 2/2017 | Eun | G06F 1/32 |
| 2017/0310849 | A1* | 10/2017 | Hosoda | G06F 3/1203 |
| 2017/0316198 | A1* | 11/2017 | Lederer | H04L 9/3271 |
| 2018/0033050 | A1* | 2/2018 | Jung | G06Q 30/0267 |
| 2018/0039384 | A1* | 2/2018 | DeLuca | H04W 4/80 |
| 2018/0276367 | A1* | 9/2018 | Benson | G06F 21/36 |
| 2019/0042722 | A1* | 2/2019 | Hansen | G06F 21/44 |
| 2019/0139390 | A1* | 5/2019 | Kawazu | G06F 3/04883 |
| 2019/0182399 | A1* | 6/2019 | Yasukawa | H04N 1/00862 |

OTHER PUBLICATIONS

"How to (Un)Lock Your PC by Being Nearby (With a Bluetooth Phone)", http://www.howtogeek.com/67556/how-to-unlock-your-pc-by-being-nearby-with-a-bluetooth-phone/, Published Jul. 17, 2011, 5 pages.

"IBM Presence Insights", https://presenceinsights.ibmcloud.com/pidocs/docs/en/, Printed Jun. 16, 2016, 1 page.

* cited by examiner

POPULATION OF USER IDENTIFIERS BASED ON NEARBY DEVICES

FIELD OF THE INVENTION

Embodiments of the invention relate to population of user identifiers based on nearby devices.

BACKGROUND

Today, people manage a multiplicity of user names and passwords for various online accounts. For example, a person may have passwords for bank accounts, online retailer's websites, email accounts, school learning portals, etc. It takes time for a person to enter a user name and password at each time of navigation to a login page. There exists a need to make account user name management more efficient.

SUMMARY OF THE INVENTION

In embodiments, a user identifier is received in a first device (e.g., as input received from a user entering the identifier). The first device is placed in discoverable proximity (of near-field communication) to a second device. In response to a login initiated on the second device, user identifiers are retrieved, by the second device, from the first device. User identifiers are displayed from the first device on the user interface of the second device as login options from which a user can select. The user identifiers may be displayed in a prioritized state based on particular factors. Sharing policies for particular user identifiers may be set based on user input.

In one aspect, embodiments of the present invention provide a computer-implemented method for population of user identifiers, comprising: receiving one or more user identifiers into a first electronic device; discovering, by a second electronic device, the first electronic device in discoverable proximity to the second electronic device; retrieving on the second electronic device, the one or more user identifiers; and displaying on the second electronic device, the one or more user identifiers in a selectable list on a login user interface of the second electronic device.

In another aspect, embodiments of the present invention provide a system for population of user identifiers, comprising: a first electronic device, the first electronic device comprising: a processor; a memory coupled to the processor; a near field communication transceiver coupled to the processor; a display coupled to the processor; a second electronic device, the second electronic device comprising; a processor; a memory coupled to the processor; a near field communication transceiver coupled to the processor; a display coupled to the processor; wherein the memory of the first electronic device contains instructions, that when executed by the processor of the first electronic device, perform the steps of receiving one or more user identifiers into a first electronic device, and wherein the memory of the second electronic device contains instructions, that when executed by the processor of the second electronic device, perform the steps of retrieving on the second electronic device, the one or more user identifiers, and displaying on the second electronic device, the one or more user identifiers in a selectable list on a user interface of the second electronic device.

In yet another aspect, embodiments of the present invention provide a computer program product for population of user identifiers on an electronic device, comprising a computer readable storage medium having program instructions embodied therewith, the program instructions executable by a processor to cause the electronic device to: retrieve one or more user identifiers from a mobile device via near field communication; and display on the electronic device, the one or more user identifiers in a selectable list on a user interface of the electronic device.

BRIEF DESCRIPTION OF THE DRAWINGS

Features of the disclosed embodiments will be more readily understood from the following detailed description of the various aspects of the invention taken in conjunction with the accompanying drawings.

Figure 1:
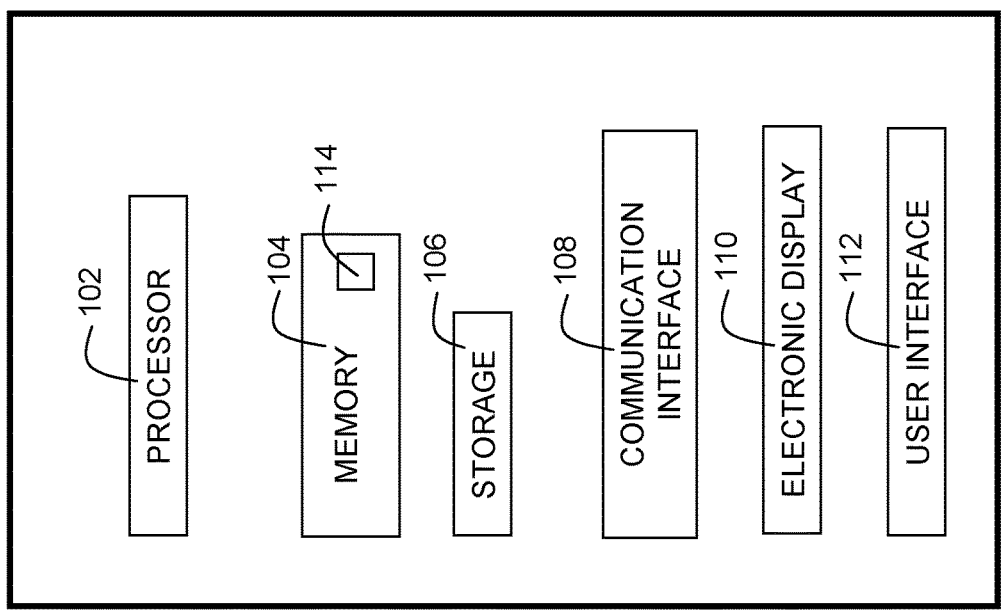
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

In embodiments, a user identifier is received in a first device (e.g., as input received from a user entering the identifier). The first device is placed in discoverable proximity (of near-field communication) to a second device. In response to a login initiated on the second device and/or proximity of the first device, user identifiers are retrieved, by the second device, from the first device. User identifiers are displayed from the first device on the user interface of the second device as login options from which a user can select. The user identifiers may be displayed in a prioritized state based on particular factors. Sharing policies for particular user identifiers may be set based on user input.

FIG. 1 is a block diagram of a device 100 in accordance with embodiments of the present invention. Device 100 includes a processor 102. The processor 102 may include one or more processing cores. Device 100 further includes memory 104. The memory 104 is coupled to the processor such that instructions stored in memory 104 can be executed by the processor 102 to implement aspects of disclosed embodiments. The memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Instructions 114 may reside in memory 104. Instructions 114 may comprise one or more modules configured to perform tasks and/or steps for carrying out embodiments of the present invention. Device 100 may further include additional storage 106. Additional storage 106 may include, but is not limited to, solid state storage such as SRAM, Flash, and/or magnetic or optical storage. Device 100 further includes a communication interface 108. The communication interface 108 includes a near field communication transceiver, and may support a variety of protocols, including, but not limited to, WiFi, BLUETOOTH®, Ethernet, TCP/IP, UDP, and/or other protocols and/or standards for communication. In embodiments, the communication interface 108 includes a BLUETOOTH® transceiver. Device 100 further includes an electronic display 110. The electronic display may include a liquid crystal display (LCD), a plasma display, a cathode ray tube (CRT) display, a light emitting diode (LED) display, an organic LED (OLED) display, or other suitable display technology. Device 100 further includes a user interface 112. In some embodiments, user interface 112 may be a touch screen, and in some embodiments, may include a capacitive and/or resistive touch screen. The user interface may provide a mechanism for a user to enter text into an application such as an e-mail program, text messaging program, and/or web browser.

Figure 2:
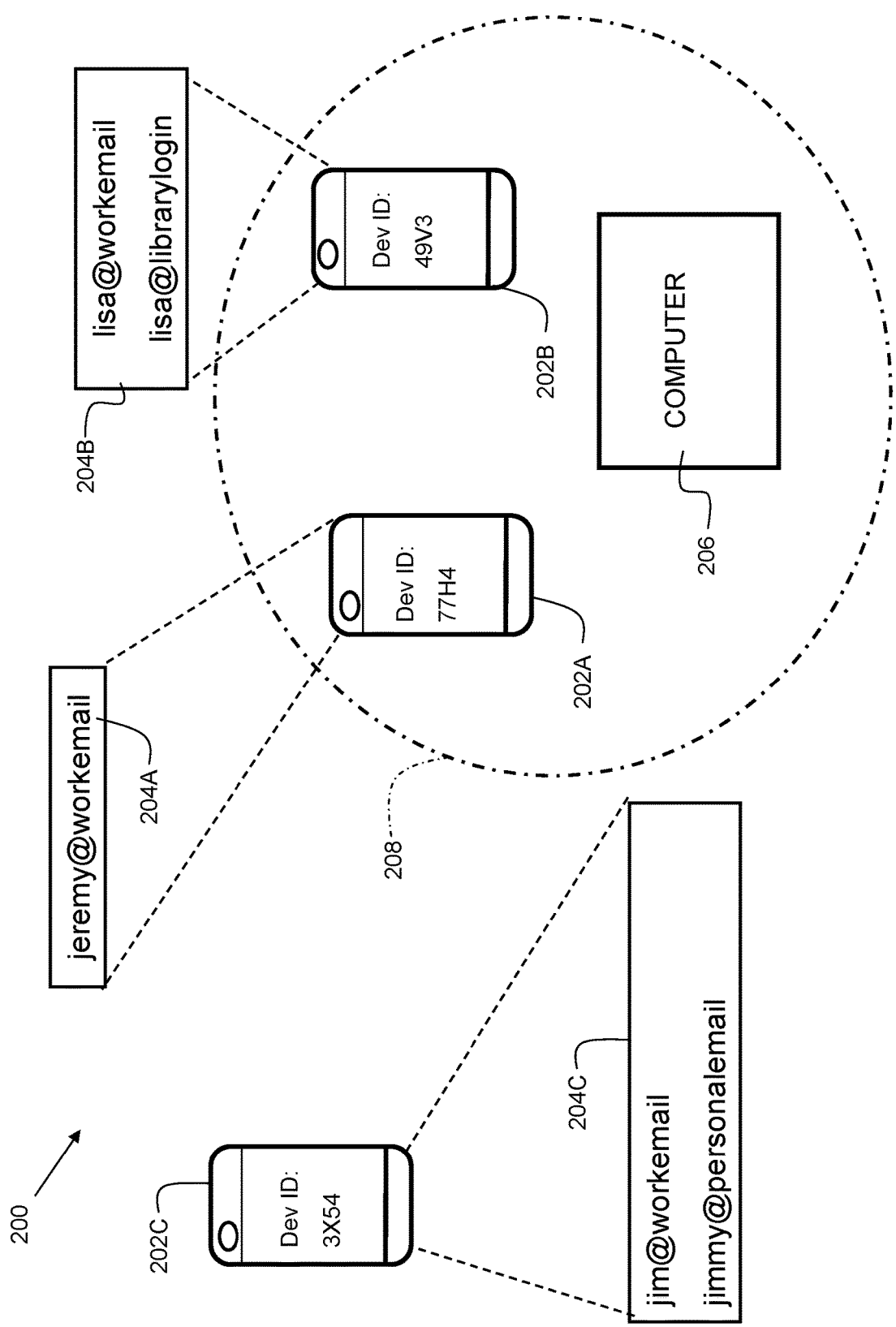
FIG. 2 is a system diagram in accordance with embodiments of the present invention.

FIG. 2 is an example of a system diagram 200 in accordance with embodiments of the present invention. Computer 206 is shown having a near field communication (NFC) range 208. Two devices 202A and 202B are within range 208 of computer 206, whereas device 202C is outside of range 208. Devices 202A, 202B, and 202C may each be a smart phone, tablet computer, desktop computer, or other computing device. Hence, devices 202A and 202B are in discoverable proximity of computer 206. Each of devices 202A, 202B, and 202C has one or more user identifiers (i.e. usernames) stored in memory. Device 202A has stored user identifier 204A—jeremy@workemail. Device 202B has stored user identifiers indicated at 204B—lisa@workemail and lisa@librarylogin. Device 202C has stored user identifiers indicated at 204C—jim@workemail and jimmy@personalemail. It should be recognized that the user identifiers can be of any suitable format, and is not limited to the format shown herein. It should be recognized that although three devices are shown (202A, 202B, and 202C), in implementations, more or fewer may be present.

Figure 3:
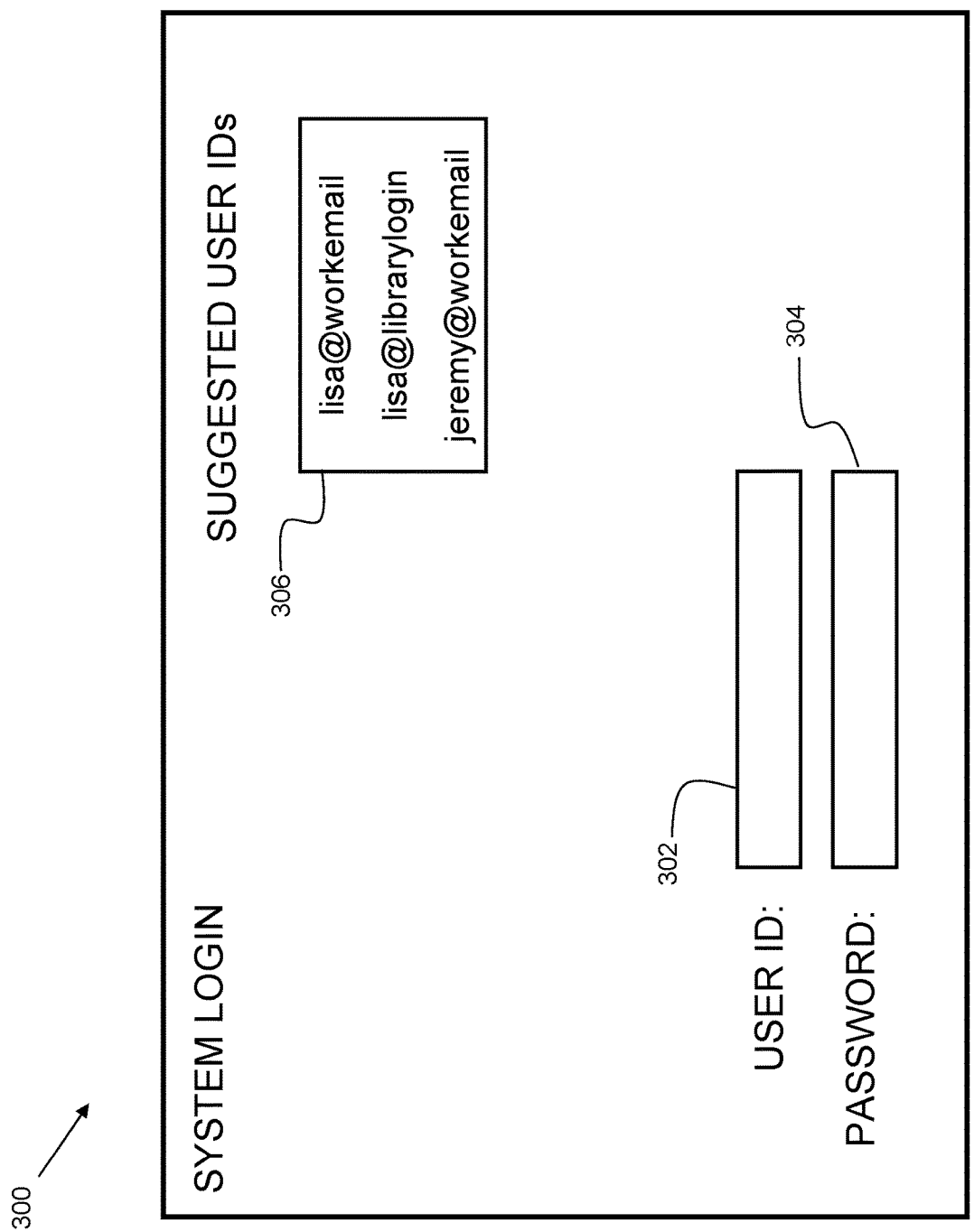
FIG. 3 is a user interface in accordance with embodiments of the present invention.

FIG. 3 is an example of a user interface in accordance with embodiments of the present invention. User interface 300 is a login user interface for a system, program, or application, etc. The presented user interface 300 includes field 302 for entry of a User ID and field 304 for entry of a password. At 306, there is shown a selectable list of User IDs located by communication with mobile devices in range to a computing device associated with user interface 300 of computer 206. In some embodiments, the selectable list can be automatically generated over time as a user logs into various accounts with his/her mobile device. Thus, embodiments may detect initiation of a login request on a device, and present the selectable list 306. In other embodiments, the user interface may be set to a login screen, and a selectable list 306 may appear on that screen when devices that are sharing user identifiers are within range, even if no login attempt occurs. Thus embodiments include retrieving on the computer 206 (FIG. 2), the one or more user identifiers from the devices 202A and 202B, and displaying those user identifiers in selectable list 306.

Figure 4:
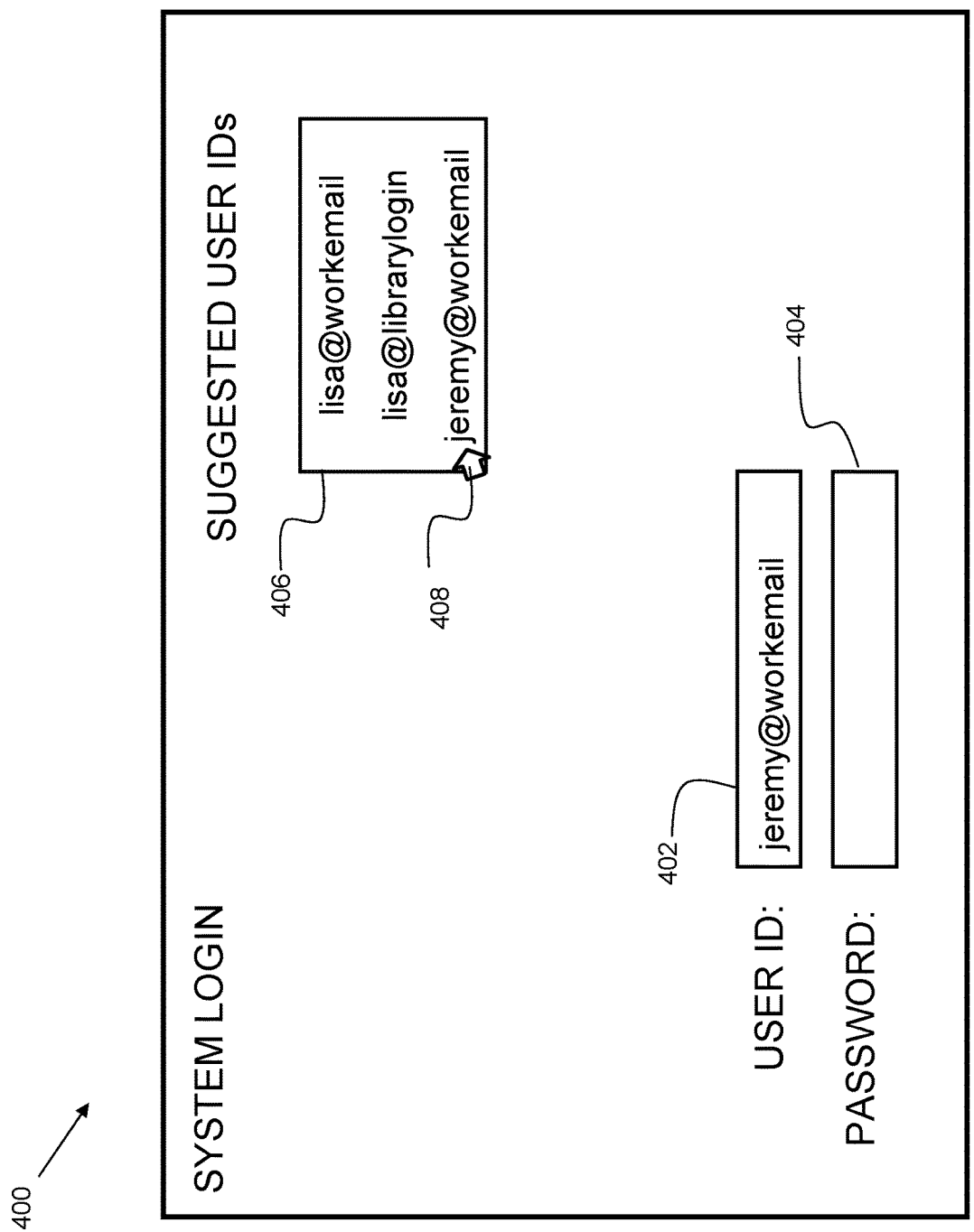
FIG. 4 is a user interface showing population of a user identifier, in accordance with embodiments of the present invention.

FIG. 4 is a user interface 400 showing a user identifier populated in field 402. User interface 400 includes field 402 for entry of a user identifier and field 404 for entry of a password. Field 402 is populated with the user identifier—jeremy@workemail. This is the result of a user selecting (e.g., using cursor 408) such user identifier from a selectable list 406 generated according to embodiments of the present invention. The user with the user identifier jeremy@workemail can then enter his password into field 404 and log on as part of a normal authentication process.

Figure 5:
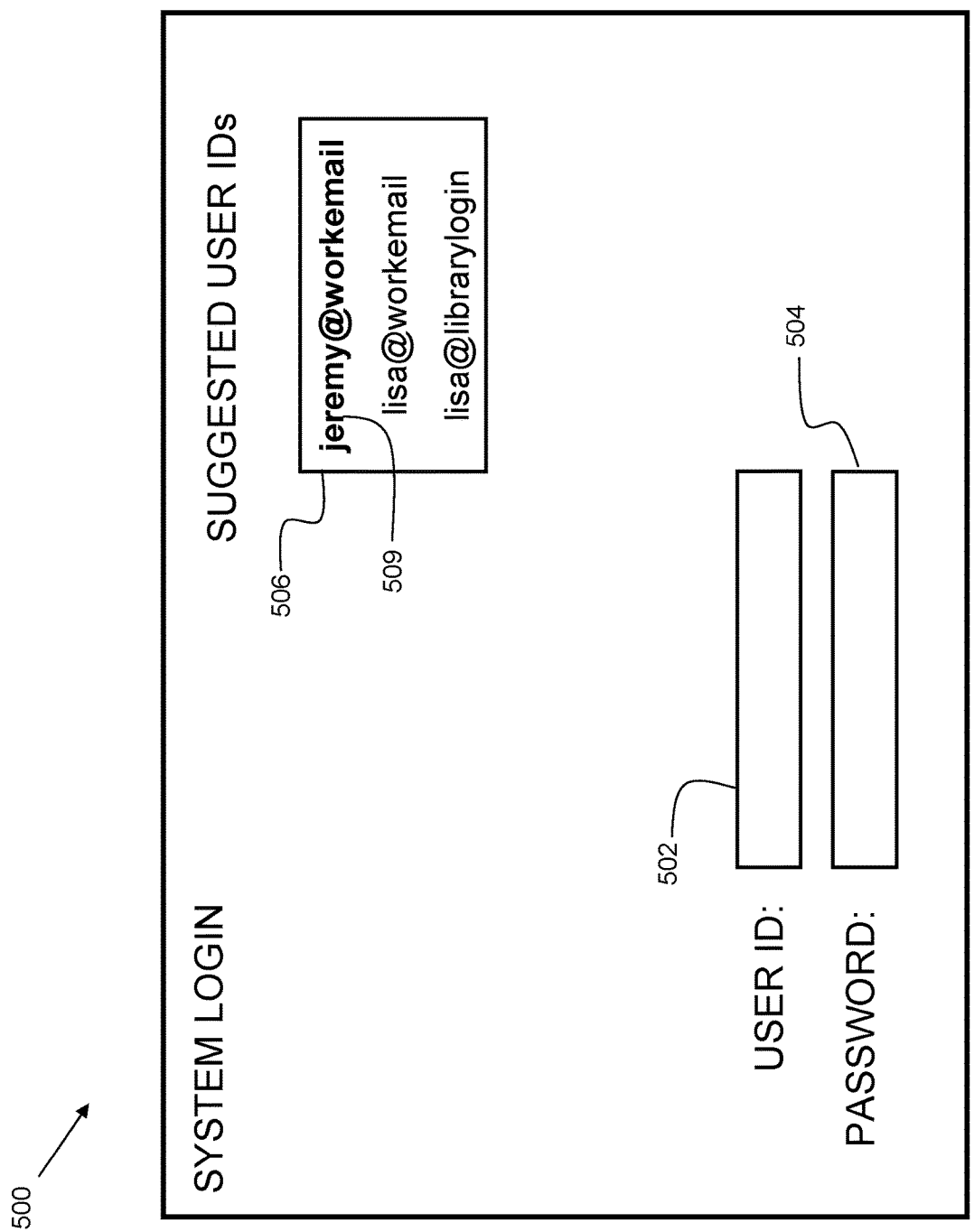
FIG. 5 is a user interface showing presentation of a user identifier in a prioritized state, in accordance with embodiments of the present invention.

FIG. 5 is a user interface showing presentation of a user identifier in a prioritized state, in accordance with embodiments of the present invention. User interface 500 includes field 502 for entry of a user identifier and field 504 for entry of a password. At 506, there is shown a selectable list of user identifiers located by communication with mobile devices in range to a computing device associated with user interface 500. In some embodiments, the selectable list may be shown in a prioritized state. For example, if a user identifier was previously used on this device, and it is also detected in a nearby device, prioritize this user identifier. In the example shown, one of the plurality of user identifiers is prioritized at 509. A prioritized state means highlighting or emphasis. This priority can be, for example, list order (e.g., highest priority at the top of the list, or vice versa), bolded font, particular colors (e.g., prioritized user identifiers in red, and all others in green), or font size (e.g., prioritized user identifiers are presented in a font larger than the font of the other user identifiers on the list), etc. In some embodiments, the list may be prioritized based on a variety of criteria. Criteria may include if a user identifier has been previously used to log on to the device associated with user interface 500. In this example, if the user identifier jeremy@workmail has previously been used to log on to the device that is rendering user interface 500, then that identifier is rendered in a prioritized state. In some embodiments, the criteria may be based on the received signal strength indication (RSSI) of the device from which the user identifier is received. The RSSI may provide an indication of proximity. Thus, user identifiers retrieved from devices that have a stronger RSSI may be displayed in a prioritized state within the selectable list.

Figure 6:
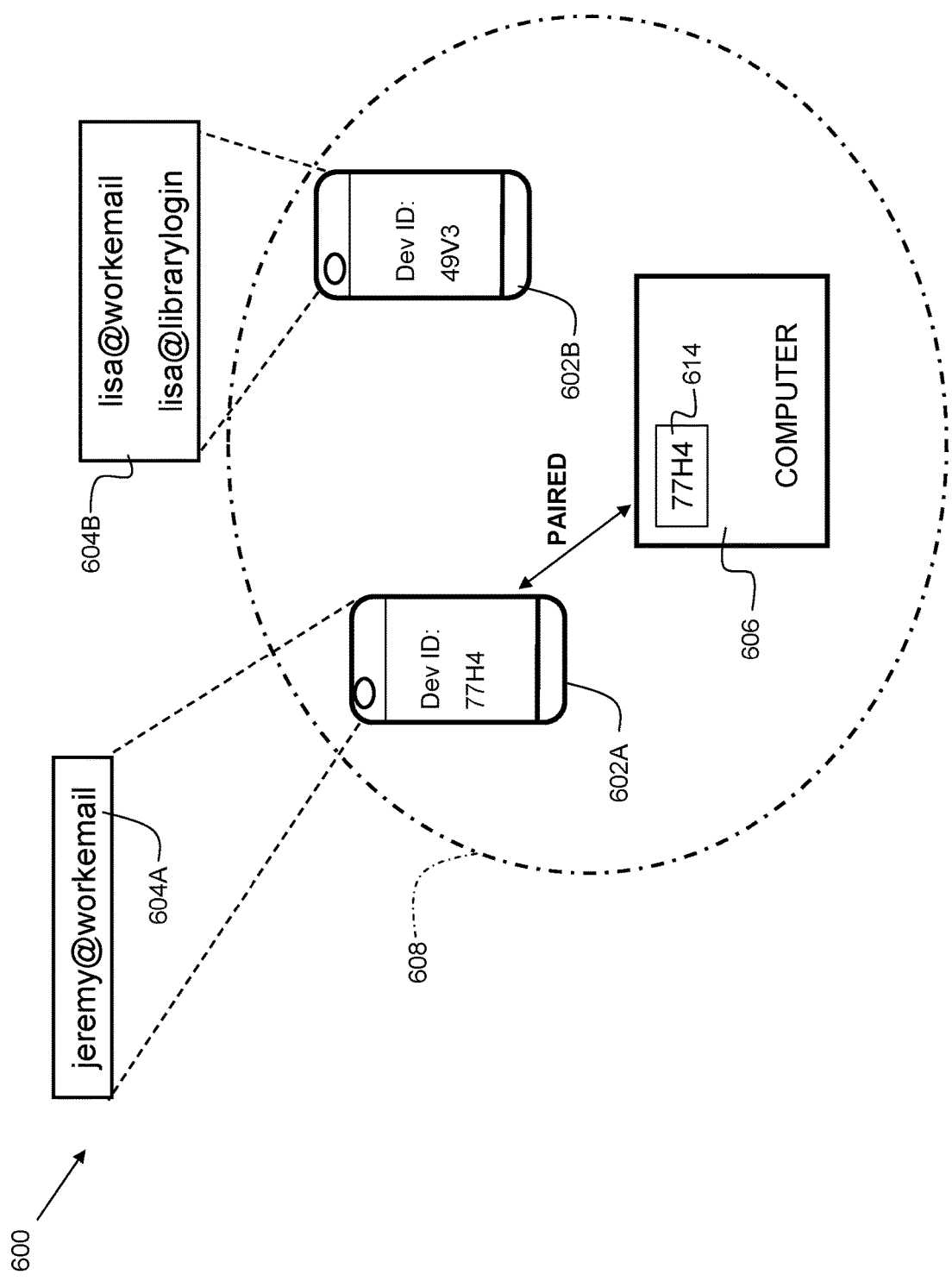
FIG. 6 is a system diagram with device pairing in accordance with embodiments of the present invention.

FIG. 6 is a system diagram showing a system 600 with device pairing in accordance with embodiments of the present invention. In some embodiments, an electronic pairing between the first electronic device and the second electronic device is performed. This pairing information may be stored in a non-volatile memory such that the device pairing may be persistent across power cycling of the devices. In such embodiments, one or more user identifiers are displayed from the first electronic device if the first electronic device is electronically paired with the second electronic device. In the example shown, device 602A and device 606 are paired, as represented by the computer 606 receiving device identifier information 614 pertaining to device 602A. Similarly, the device 602A may receive device identification data from the computer (not shown). The device identifier data could include, but is not limited to, a MAC address, a device serial number, a digital certificate, or other identifiable data. In the example, the device ID 614 of device 602A is stored on computer 606. The device ID shown here is generic, but in embodiments, this could be a BLUETOOTH® device address that is obtained as part of the BLUETOOTH® pairing process. Thus, while both device 602A and device 602B are within near field communication (NFC) range 608, only the user identifier(s) from device 602A are presented on computer 606, because device 602A is paired while device 602B is not paired.

Figure 7:
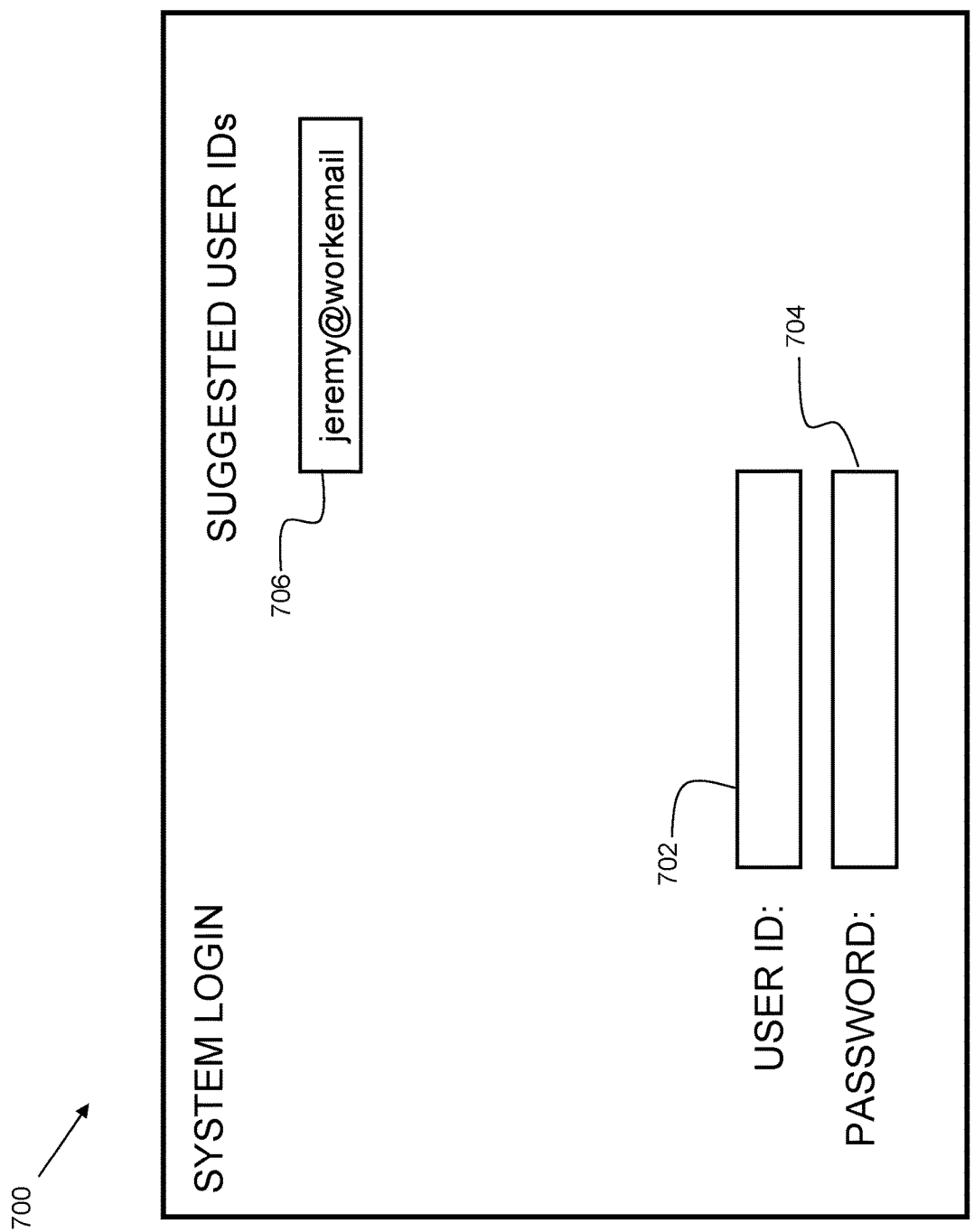
FIG. 7 is a user interface based on the example shown in FIG. 6, in accordance with embodiments of the present invention.

FIG. 7 is a user interface based on the example shown in FIG. 6, in accordance with embodiments of the present invention. Referring to FIG. 6, device 602A is paired with computer 606, while device 602B is not paired with computer 606. Thus, in this embodiment, only the user identifier 604A from device 602A is shown in user interface 700 at 706. The user identifiers from 604B are not displayed in user interface 700 since device 602B is not paired. The user may select the user identifier at 706 to populate in user ID field 702. The user may then enter his password in field 704 to complete the authentication process.

Figure 8:
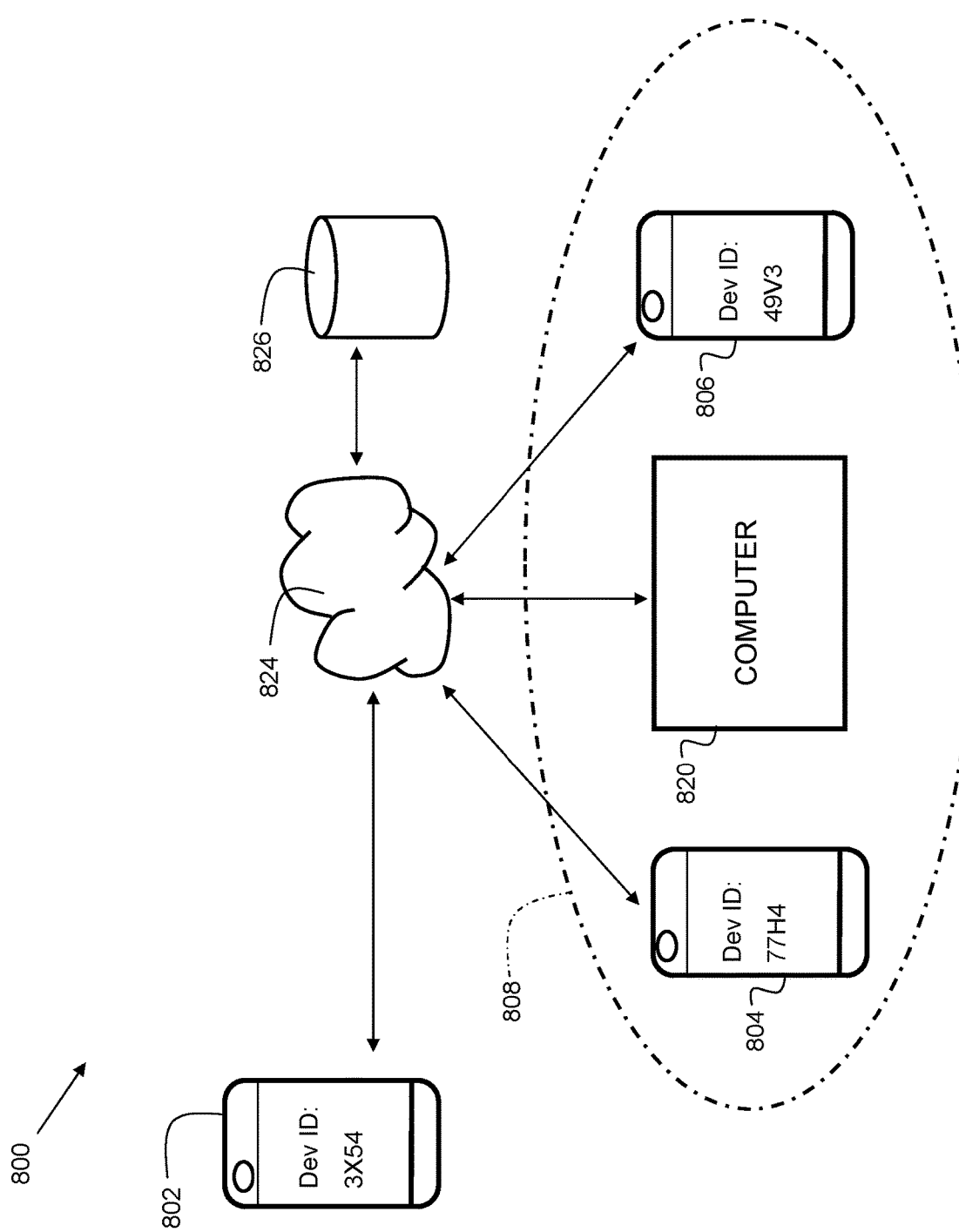
FIG. 8 is a system diagram including a data server in accordance with embodiments of the present invention.

FIG. 8 is a system diagram showing a system 800 including a data server in accordance with embodiments of the present invention. Devices 802, 804, and 806, data server 826, and computer 820 are in communication over network 824. Network 824 may be the Internet, local area network, wide area network, cloud computing network, etc. In the embodiment shown, each mobile device stores its device ID and corresponding user IDs on data server 826, the computer 820 detects nearby devices (those within near field communication (NFC) range 808), and looks up the corresponding user IDs from the data server 826. Thus embodiments include retrieving on the computer 820, the one or more user identifiers from the data server 826 based on a query of the data server 826 by the computer 820, wherein the query includes the device identifier.

Figure 9:
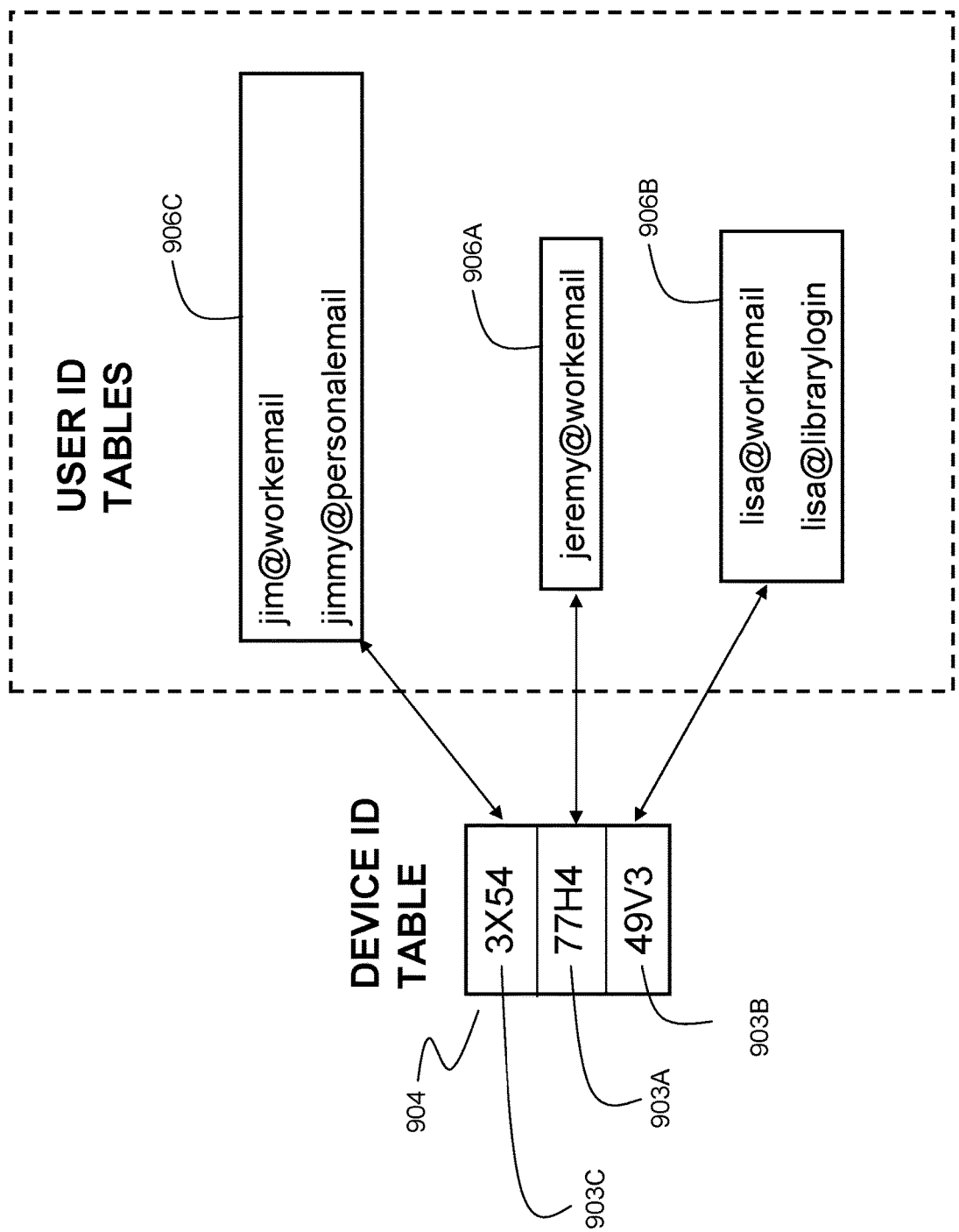
FIG. 9 shows exemplary data tables in accordance with embodiments of the present invention.

FIG. 9 shows exemplary data tables in accordance with embodiments of the present invention. The user identifiers are detected from devices based on an association of the user identifiers with the device identifier of the device on which they are stored. Device ID table 904 stores device identifiers 903A, 903B, and 903C, which are shown mapped with user identifier tables 906A, 9066, and 906C, respectively. Referring also to FIG. 2, device 202A is shown with device ID 77H4, device 202B is shown with device ID 49V3, and device 202C is shown with device ID 3X54. The device IDs are mapped to the respective user identifiers in the user tables.

Figure 10:
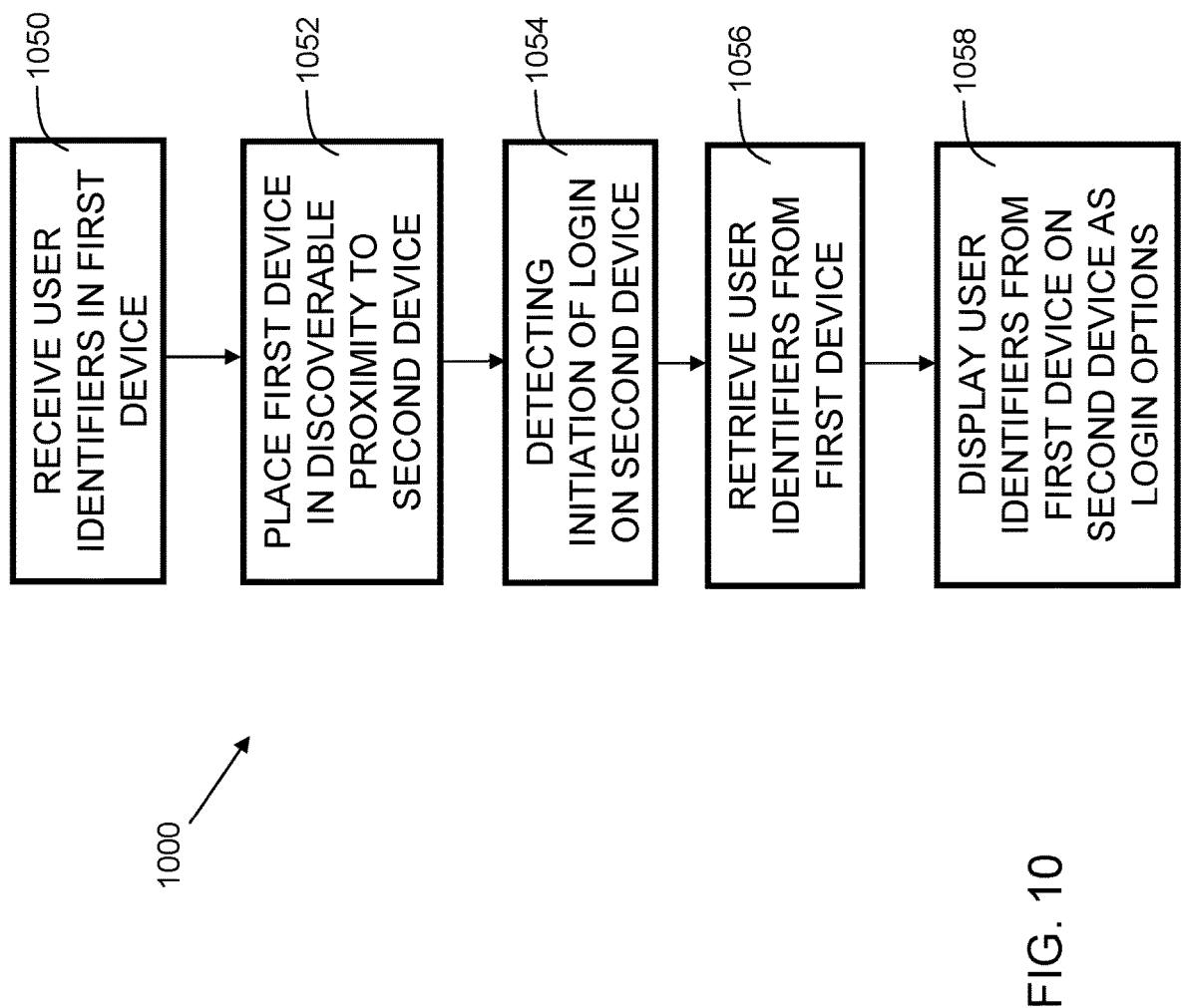
FIG. 10 is a flowchart indicating process steps for embodiments of the present invention.

FIG. 10 is a flowchart 1000 indicating process steps for embodiments of the present invention. A user identifier is received in a first device (from a user entering the ID), at 1050. The first device is placed in discoverable proximity to a second device, at 1052. Login is initiated on the second device, at 1054. User identifiers are retrieved from a first device, at 1056. User identifiers are displayed from the first device on the user interface of the second device as login options, at 1058.

Figure 11:
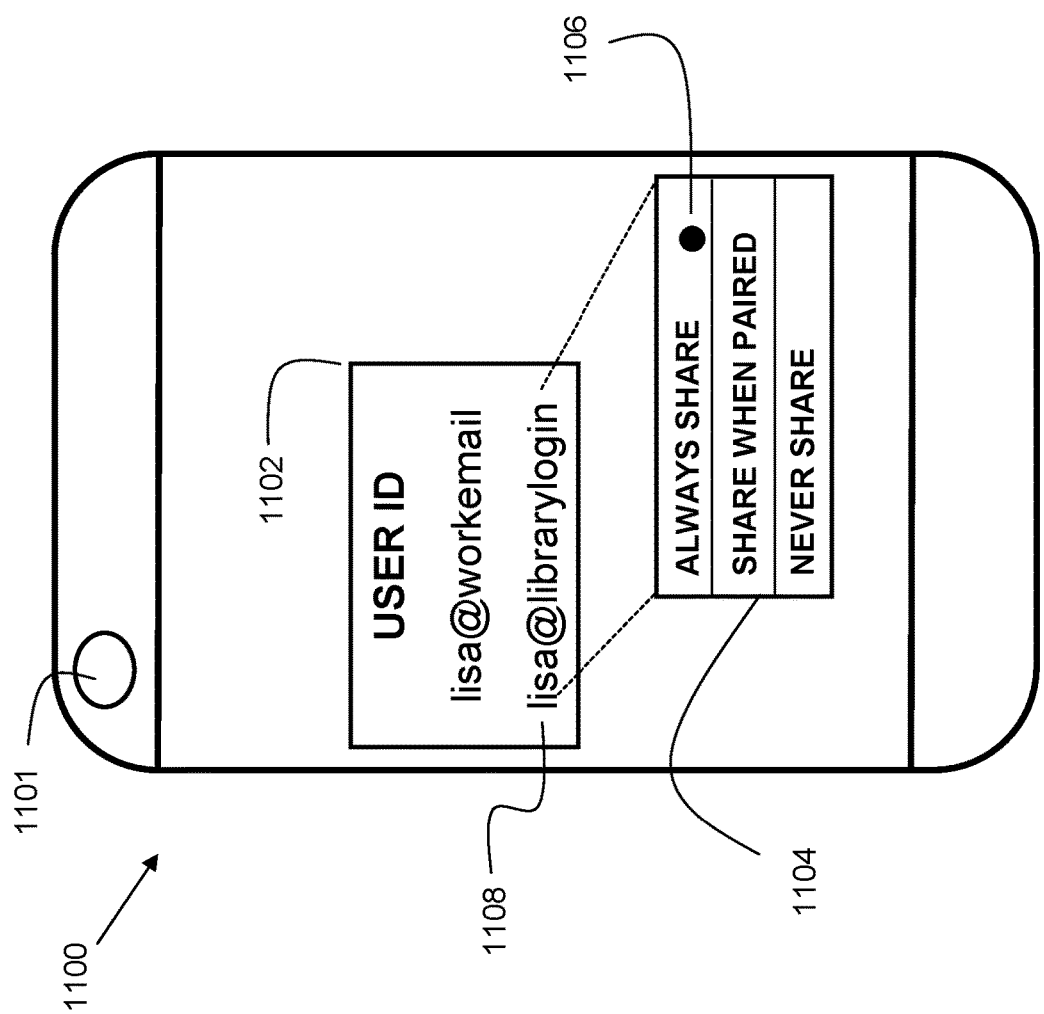
FIG. 11 is a device having a user interface for establishing a sharing restriction in accordance with embodiments of the present invention.

FIG. 11 is a device 1100 having a user interface for establishing a sharing restriction in accordance with embodiments of the present invention. Device may have button 1101 for input or power on/off. In some embodiments, one or more restrictions may be made on the sharing of a user identifier. For example, a user may select a user ID from a list 1102 of those stored in the memory of the mobile device. A menu 1104, for example, a "pop-up" window, may be presented on the user interface in response to the selection of the user ID. The menu may include various filtering options, for example, without limitation, "Always Share", "Share When Paired", or "Never Share". A user may select one of the options, which will be enforced as a policy of the mobile device. In the example shown, the user has selected "Always Share", as represented by the icon 1106, for the user identifier 1108.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for population of user identifiers, the method comprising:

discovering, by a first electronic device, a second electronic device in discoverable proximity to the first electronic device;

retrieving, by the first electronic device, one or more user identifiers from the second electronic device;

receiving, by the first electronic device, a request to log into an application;

prioritizing at least one of the plurality of user identifiers over at least one other of the plurality of user identifiers based on the plurality of user identifiers having been previously used to log on to the second electronic device;

in response to the receiving, by the first electronic device, the request to log into the application, displaying on the first electronic device, the plurality of user identifiers, retrieved from the second electronic device, in a selectable list, according to the priority, on a login user interface of the first electronic device;

receiving, from a user, by the first electronic device, a selection of one of a user identifier of the one or more user identifiers on the selectable list;

populating, by the first electronic device, the selected user identifier into a field on an authentication screen;

receiving, by the first electronic device, a password from a user; and authenticating, by the first electronic device, the user based on the selected user identifier and the password;

wherein the first electronic device and the second electronic device are each mobile devices.

2. The method of claim 1, further comprising recording a selected user identifier from the selectable list and storing the selected user identifier on the first electronic device.

3. The method of claim 1, further comprising performing an electronic pairing between the first electronic device and the second electronic device, and wherein displaying on the first electronic device, the one or more user identifiers in a selectable list on a user interface comprises only displaying one or more user identifiers from the second electronic device if the second electronic device is electronically paired with the first electronic device.

4. The method of claim 3, wherein performing an electronic pairing between the first electronic device and the second electronic device comprises performing a BLUETOOTH pairing.

5. The method of claim 1, wherein the prioritized state of the selectable list is based on a received signal strength indication.

6. The method of claim 1, wherein the prioritized state of the selectable list is based on the selected user identifier.

7. The method of claim 1, further comprising: retrieving on the first electronic device, the one or more user identifiers from the data server based on a query of the data server by the second electronic device, wherein the query includes the device identifier.

8. An electronic device comprising:
a processor;
a memory coupled to the processor;
a near field communication transceiver coupled to the processor;
a display coupled to the processor;
wherein the electronic device is a first electronic device, and
wherein the memory of the first electronic device contains instructions, that when executed by the processor of the first electronic device, perform the steps of:
discovering a second electronic device in discoverable proximity to the first electronic device;
retrieving one or more user identifiers from the second electronic device;
receiving a request to log into an application;
prioritizing at least one of the plurality of user identifiers over at least one other of the plurality of user identifiers based on the at least one of the plurality of user identifiers having been previously used to log on to the second electronic device;
in response to the receiving the request, displaying on the first electronic device, the one or more user identifiers, retrieved from the second electronic device, in a selectable list, according to the priority, on a login user interface of the first electronic device;
receiving, from a user, a selection of one of a user identifier of the one or more user identifiers on the selectable list;
populating the selected user identifier into a field on an authentication screen;
receiving a password from a user; and
authenticating the user based on the selected user identifier and the password;
wherein the first electronic device and the second electronic device are each mobile devices.

9. The electronic device of claim 8, wherein the memory further contains instructions, that when executed by the processor, perform the step of establishing a sharing restriction.

10. The electronic device of claim 9, wherein the memory further contains instructions, that when executed by the processor, perform the step of establishing a sharing restriction of never share.

11. The electronic device of claim 9, wherein the memory further contains instructions, that when executed by the processor, perform the step of establishing a sharing restriction of share when paired.

12. The electronic device of claim 9, wherein the memory further contains instructions, that when executed by the processor, perform the step of establishing a sharing restriction of always share.

13. The electronic device of claim 9, wherein the memory further contains instructions, that when executed by the processor, perform the steps of recording a user selection from the selectable list and storing the user selection on the first electronic device.

14. The electronic device of claim 8, wherein the memory further contains instructions, that when executed by the processor, perform the step of: retrieving on the first electronic device, the one or more user identifiers from the data server based on a query of the data server by the first electronic device, wherein the query includes the device identifier.

15. The electronic device of claim 8, wherein the near field communication transceiver of the first electronic device comprises a BLUETOOTH transceiver, and wherein a near field communication transceiver of the second electronic device comprises a BLUETOOTH transceiver.

16. A computer program product for population of user identifiers on a first electronic device, comprising a computer readable hardware storage device having program instructions embodied therewith, the program instructions executable by a processor to cause the first electronic device to:
retrieve one or more user identifiers from a second electronic device via near field communication;
receive a request to log into an application;
prioritizing at least one of the plurality of user identifiers over at least one other of the plurality of user identifiers based on the at least one of the plurality of user identifiers having been previously used to log on to the second electronic device;
in response to the receiving the request, displaying on the first electronic device, the one or more user identifiers, retrieved from the second electronic device, in a selectable list, according to the priority, on a login user interface of the first electronic device;
receive, from a user, a selection of one of a user identifier of the one or more user identifiers on the selectable list;
populate the selected user identifier into a field on an authentication screen;
receive a password from a user; and
authenticate the user based on the user identifier and the password;
wherein the first electronic device and the second electronic device are each mobile devices.

17. The computer program product of claim 16, wherein the computer readable hardware storage device further includes instructions executable by the processor to cause the first electronic device to record a user selection from the selectable list and store the user selection on the first electronic device.

* * * * *